US012570008B2

(12) United States Patent
Tang et al.

(10) Patent No.: US 12,570,008 B2
(45) Date of Patent: Mar. 10, 2026

(54) VACUUM SUCTION PEN FOR HANDLING OBJECTS AND MATERIALS TO AVOID HAND CONTACT

(71) Applicant: TRIPLE WIN TECHNOLOGY(SHENZHEN) CO.LTD., Shenzhen (CN)

(72) Inventors: Gen Tang, Shenzhen (CN); Chun-Hung Chen, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 994 days.

(21) Appl. No.: 17/725,775

(22) Filed: Apr. 21, 2022

(65) Prior Publication Data

US 2023/0014851 A1      Jan. 19, 2023

(30) Foreign Application Priority Data

Jul. 6, 2021    (CN) .......................... 202110763626.8

(51) Int. Cl.
B25J 15/06              (2006.01)
(52) U.S. Cl.
CPC .................................. B25J 15/0616 (2013.01)
(58) Field of Classification Search
CPC .......................... G07F 11/1657; B25J 15/0616
See application file for complete search history.

(56) References Cited

U.S. PATENT DOCUMENTS 9,233,812 B2 *    1/2016  Martin ..................... B65H 7/02

FOREIGN PATENT DOCUMENTS

| CN | 203288631 | 11/2013 |
| CN | 203690272 | 7/2014 |
| CN | 203859136 | 10/2014 |
| CN | 104319254 | 1/2015 |
| CN | 206340099 | 7/2017 |
| CN | 210575888 | 5/2020 |

* cited by examiner

*Primary Examiner* — Daniel Jeremy Leeds
(74) *Attorney, Agent, or Firm* — ScienBiziP, P.C.

(57) ABSTRACT

A vacuum suction pen to take reliable hold of objects of different shapes without manual contact includes a holder with an air duct penetrating the holder. A first sleeve is sleeved on one end of the holder, and a first adsorption module is movably arranged on the first sleeve to move along a first direction. The first suction nozzle can move in the horizontal direction, the second nozzle can move in the vertical direction, and the third suction nozzle can rotate around the holder. The positions and relative positions of each suction nozzle on the product to be lifted and manipulated can be adjusted, so as to more accurately locate the center of gravity of products with irregular shapes or of uneven materials, and so as to secure a stable hold on the objects.

8 Claims, 3 Drawing Sheets

100

100

30

10

90

50
70

VACUUM SUCTION PEN FOR HANDLING OBJECTS AND MATERIALS TO AVOID HAND CONTACT

FIELD

The subject matter herein generally relates to materials handling, to a device capable of lifting by suction a product with an irregular shape or made of an uneven material.

BACKGROUND

In order to avoid contamination caused by direct hand contact with a product, vacuum rods can be used to pick up and manipulate a product to a desired position. The suction device may be a manual vacuum suction device or an electric vacuum suction pen. The manual vacuum suction device creates a vacuum pressure by manual pressing an airbag in the pen. However, the suction force caused by such vacuum pressure may be too weak to firmly hold the product. The electric vacuum suction device is connected to an external vacuum device to create a vacuum pressure in the air bag, and the suction force is lasting and reliable.

Furthermore, when a product with an irregular shape or made of uneven materials (for example, when the density of materials in a product is not uniform) needs to be lifted by suction, the electric vacuum suction device may not be able to firmly hold the product if the suction device is at a position not on or directly in line with the center of gravity of the product.

BRIEF DESCRIPTION OF THE DRAWINGS

Implementations of the present disclosure will now be described, by way of embodiments only, with reference to the attached figures.

The following detailed description will further describe the embodiments of the present application with reference to the above drawings.

DETAILED DESCRIPTION

Unless otherwise defined, all technical and scientific terms used herein have the same meaning as commonly understood by one of ordinary skill in the art. The terms used herein are only for the purpose of describing specific embodiments, but not intended to limit the embodiments of the present application.

In the present application, the axial direction of the vacuum suction pen, which resembles a thin rubber-tipped rod which may be held vertically (holder 10) is defined as the vertical direction, and the direction perpendicular to the axial direction is defined as the horizontal direction.

Figure 1:
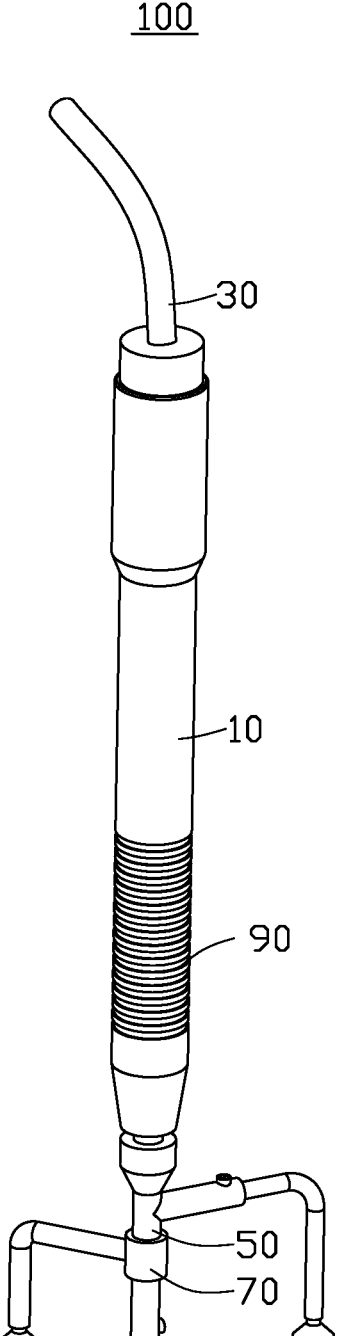
FIG. 1 is a diagrammatic view of an embodiment of a vacuum suction device according to the present disclosure.

Referring to FIG. 1, the present application provides a vacuum suction device 100, which includes a holder 10, an air duct 30 penetrating the holder 10, and a first sleeve 50 sleeved on one end of the holder 10. The holder 10 defines a through hole penetrating through opposite ends thereof. The air duct 30 passes through the through hole, and is mounted to the holder 10. Both ends of the air duct 30 are exposed from the holder 10. In this embodiment, the air duct 30 penetrates the holder 10 in the vertical direction.

Figure 2:
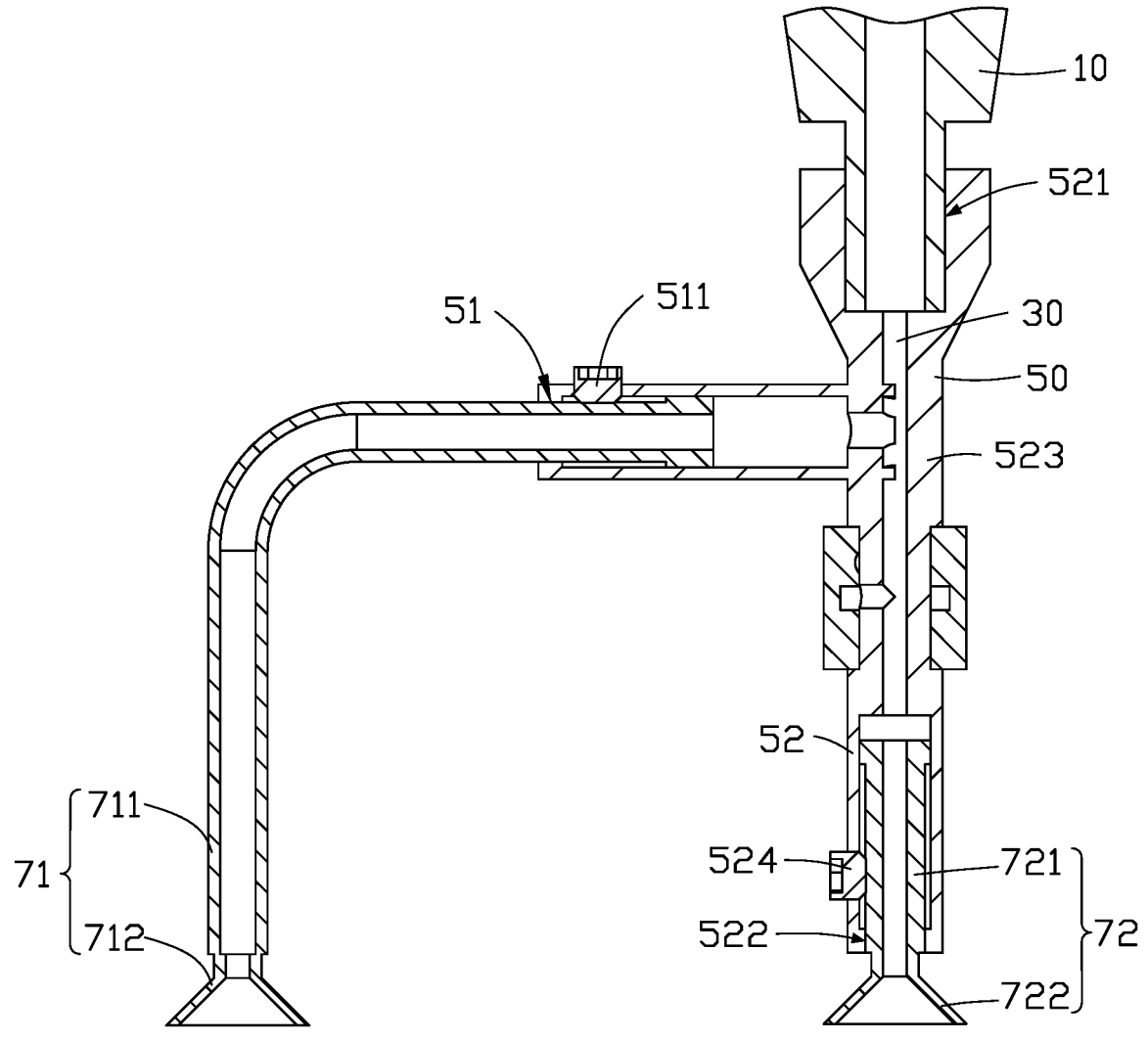
FIG. 2 is a diagrammatic view of an embodiment of a first suction module and a third suction module of the vacuum suction device of FIG. 1.

Referring to FIG. 2, in this embodiment, the shape of the first sleeve 50 is similar to that of a three-way pipe. The first sleeve 50 includes a first portion 51 and a second portion 52 perpendicular to each other. The first portion 51 extends in the horizontal direction, the second portion 52 extends in the vertical direction, the first portion 51 and the second portion 52 can be connected with each other. The second portion 52 includes a first end 521, a second end 522, and a chamber 523 connecting between the first end 521 and the second end 522. The first end 521 is a portion of the first sleeve 50, which extends from an edge (the upper edge in FIG. 2) of the first sleeve 50 near the holder 10 inward (downward in FIG. 2) by a preset length of 20% to 30% with respect to total length of the first sleeve 50. The second end 522 is another portion of the first sleeve 50, which extends from another edge (the lower edge in FIG. 2) of the first sleeve 50 away from the holder 10 inward (upward in FIG. 2) by the present length. The first end 521 is sleeved on one end of the holder 10. The air duct 30 penetrates through the holder 10 and is exposed from the holder 10, and the air duct 30 exposed from the holder 10 extends inside the first sleeve 50. An inner diameter of the first end 521 is equal to or slightly larger than an outer diameter of the holder 10, so that the first end 521 and the holder 10 are sealed together by interference fit. A sealing structure (not shown in drawings) may be provided between the first end 521 and the barrel 10 to avoid air leakage, and the sealing structure may include but is not limited to a rubber ring.

As shown in FIG. 2, the first portion 51 is provided with a first suction module 71, which includes a first connecting pipe 711 connected to the first portion 51 and a first suction nozzle 712 connected to the first connecting pipe 711. A part of the first connecting pipe 711 is movably arranged in the first end 521. The inner diameter of the first portion 51 is slightly larger than the outer diameter of the first connecting pipe 711, and another sealing structure can be provided between the first portion 51 and the first connecting pipe 711 to avoid air leakage. The first suction nozzle 712 and the first connecting pipe 711 may be an integrally formed structure or a non-integrated formed structure (that is, the first suction nozzle 712 can be replaced independently). The material of the first suction nozzle 712 includes, but is not limited to, polytetrafluoroethylene (PTFE), polyethylene terephthalate (PET), and the like.

As shown in FIG. 2, the first portion 51 has a certain length in the horizontal direction. The first connecting pipe 711 has two parts extending horizontally (horizontal part) and vertically (vertical part), and the two parts are connected by an elbow. When the horizontal part of the first connecting pipe 711 moves in the first portion 51, the first suction nozzle 712 moves in the horizontal direction along with the first connecting pipe 711, so as to adjust the position of the first suction nozzle 712 on the product to be lifted and locate the center of gravity of the product. Thus, the first suction nozzle 712 can stably hold the product.

Furthermore, the first portion 51 is provided with a first fixing structure 511, and the first fixing structure 511 is configured for fixing the first connecting pipe 711 in the first portion 51. In this embodiment, the first fixing structure 511 can be a catch bolt. The inner wall of the first portion 51 is provided with a screw hole, and the catch bolt is installed in the screw hole. When the catch bolt is rotated to abut against the outer wall of the first connecting pipe 711, a pressing force and a friction force are generated, which can fix the first connecting pipe 711 in the first portion 51. When the catch bolt is rotated to be away from the outer wall of the first connecting pipe 711, the first connecting pipe 711 can move in the first portion. In other embodiments, the first fixing structure 511 may also be other elements having a fixing and limiting function, such as a clamp.

Referring to FIG. 2, in the vertical direction, the second end 522 is provided with a second suction module 72, which includes a second connecting pipe 721 connected to the second end 522 and a second suction nozzle 722 connected to the second connecting pipe 721. Furthermore, the second connecting pipe 721 is sleeved on the air duct 30. The inner diameter of the second connecting pipe 721 is larger than the outer diameter of the air duct 30, and the outer diameter of the second connecting pipe 721 is smaller than the inner diameter of the second end 522. Another sealing structure may be provided between the second connecting pipe 721 and the air duct 30 to avoid air leakage. The sealing structure includes but is not limited to a rubber ring.

In the vertical direction, the second connecting pipe 721 can move in the second end 522 along the air duct 30, that is, the second connecting pipe 721 can move in the vertical direction. Thus, the second connecting pipe 721 can drive the second suction nozzle 722 to move in the vertical direction, and thus adjust the direct contact of the second suction nozzle 722 on the product to be lifted, so that the second connecting pipe 721 can locate the center of gravity of the product. In this embodiment, the air duct 30 extending in the first sleeve 50 has a smaller inner diameter and a smaller outer diameter compared to those of the air duct 30 in the holder 10. In this way, it is more favorable for the second connecting pipe 721 to move along the air duct 30 (if the inner and outer diameters of the air duct 30 remain unchanged, the inner and outer diameters of the second connecting pipe 721 would need to be increased, and under the condition that the inner diameter of the second end 522 remains unchanged, the outer diameter of the second connecting pipe 721 and the inner diameter of the second end 522 would be little different, which will affect vertical movement of the second connecting pipe 721). The second suction nozzle 722 and the second connecting pipe 721 may be an integrally formed structure or a non-integrated formed structure (that is, the second suction nozzle 722 can be replaced independently). The material of the second suction nozzle 722 includes, but is not limited to, PTFE, PET, and the like.

Furthermore, the second end 522 is provided with a second fixing structure 524, and the second fixing structure 524 is configured for fixing the second connecting pipe 721 in the second end 522. In this embodiment, the second fixing structure 524 can be a catch bolt. The inner wall of the second end 522 is provided with a screw hole, and the catch bolt is installed in the screw hole. When the catch bolt is rotated to abut against the outer wall of the second connecting pipe 721, a pressing force and a friction force are generated, which fix the second connecting pipe 721 in the second end 522. When the catch bolt is rotated away from the outer wall of the second connecting pipe 721, the second connecting pipe 721 can move. In other embodiments, the second fixing structure 524 may also be other elements having a fixing and limiting function, such as a clamp.

Figure 3:
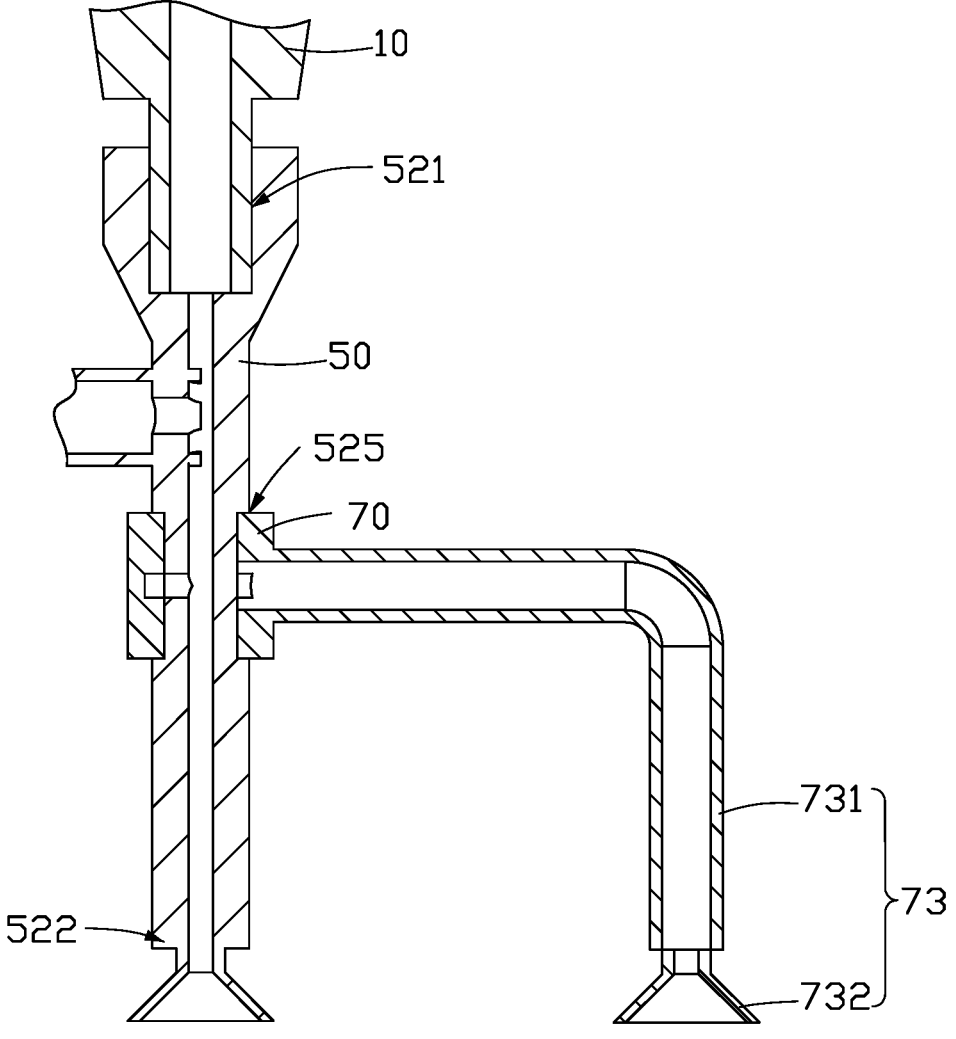
FIG. 3 is a diagrammatic view of an embodiment of a second suction module of the vacuum suction device of FIG. 1.

Referring to FIG. 1 and FIG. 3, the vacuum suction device 100 further includes a third suction module 73 and a second sleeve 70. The second sleeve 70 is rotatably sleeved on the outer wall of the second portion 52 (mainly the chamber 523) and connects with the second portion 52. The third suction module 73 is connected to the second portion 52. A portion of the outer diameter of the chamber 523 is reduced to form a groove 525, and the second sleeve 70 is embedded in the groove 525. Therefore, the second sleeve 70 cannot move in the vertical direction, but can only rotate around the first sleeve 50. The second sleeve 70 is provided with a third suction module 73, which includes a third connecting pipe 731 connected to the second sleeve 70 and a third suction nozzle 732 connected to the third connecting pipe 731. The second sleeve 70 can drive the third suction module 73 to rotate around the first sleeve 50. That is, the third suction nozzle 732 can rotate around the first sleeve 50 to adjust the position of the suction nozzle 732 on the product to be lifted, and so as to locate the center of gravity of the product. The third suction nozzle 732 and the third connecting pipe 731 may be an integrally formed structure or a non-integrated formed structure (that is, the third suction nozzle 732 can be replaced independently). The third suction nozzle 732 includes, but is not limited to, PTFE, polyethylene terephthalate PET, and the like.

Furthermore, the second sleeve 70 may be provided with a fixing structure (not shown in the drawings) to fix the second sleeve 70, to prevent the second sleeve 70 from rotating around the first sleeve 50. In this embodiment, the fixing structure may be a clamp. The clamp is composed of a screw, and left and right halves of a clamp. When the screw is rotated to connect the left half clamp to the right half clamp, a pressing force and a friction force are generated around the second sleeve 70, which can fix the second sleeve 70. When the left half clamp and the right half clamp are separated from each other by rotating the screw, the second sleeve 70 can rotate around the first sleeve. In other embodiments, the fixing structure may also be other elements having a fixing and limiting function, such as catch bolts and the like.

In other embodiments, the vacuum suction device 100 may also be provided with more suction modules to take a better hold at the center of gravity of the product.

In some embodiments, the other end of the air duct 30 is connected to an external vacuum device (not shown in the drawings), and the vacuum device is configured to provide a vacuum environment for the vacuum suction device 100.

In some embodiments, the outer wall of the holder 10 is provided with threads 90 (referring to FIG. 1), and the threads 90 increase the friction between hand of user and the holder 10 to facilitate grasping.

With the above configuration, the first suction nozzle 712 can move in the horizontal direction, the second suction nozzle 722 can move in the vertical direction, and the third suction nozzle 732 can rotate around the holder. The above movement and rotation allows each suction nozzle on the product to more effectively take hold of the product, so as to locate the center of gravity of the product with an irregular shape or uneven materials and to hold the product more stably.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A vacuum suction device comprising:

a holder;

an air duct penetrating the holder;

a first sleeve sleeved on an end of the holder; and a first suction module movably arranged on the first sleeve, wherein the first suction module is configured to move in a first direction, the vacuum suction device further comprises a second suction module, the second suction module is movably arranged on the first sleeve and configured to move in a second direction perpendicular to the first direction, the vacuum suction device further comprises a third suction module and a second sleeve, the second sleeve is rotatably sleeved on an outer wall of the first sleeve and connects with the first sleeve, the third-suction module connects with the second sleeve.

2. The vacuum suction device of claim 1, wherein the first sleeve comprises a first portion extending along the first direction and a second portion extending along the second direction, the first portion and the second portion are connected with each other; a portion of the first suction module is movably arranged in the first portion, and a portion of the second suction module is movably arranged in the second portion, the second sleeve is rotatably sleeved on an outer wall of the second portion and connects with the second portion.

3. The vacuum suction device of claim 2, wherein the first suction module comprises a first connecting pipe at least partially movably arranged in the first portion and a first suction nozzle connected to the first connecting pipe, and the second suction module comprises a second connecting pipe at least partially movably arranged in the second portion and a second suction nozzle connected to the second connecting pipe.

4. The vacuum suction device of claim 3, wherein the first portion comprises a first fixing structure configured for fixing the first connecting pipe in the first portion, and the second portion comprises a second fixing structure configured for fixing the second connecting pipe in the second portion.

5. The vacuum suction device of claim 2, wherein the third suction module comprises a third connecting pipe connected to the second sleeve and a third suction nozzle connected to the third connecting pipe.

6. The vacuum suction device of claim 5, wherein the second portion defines a groove, and the second sleeve is embedded in the groove.

7. The vacuum suction device of claim 1, wherein an end of the air duct away from the second suction module is configured to be connected to a vacuum device.

8. The vacuum suction device of claim 1, wherein an outer wall of the holder defines threads.

* * * * *